No. 636,959. Patented Nov. 14, 1899.
J. F. DORNFELD.
MALT TURNING AND STIRRING MECHANISM.
(Application filed Nov. 2, 1898.)
(No Model.) 6 Sheets—Sheet 1.

Witnesses
C. H. Keeney
Anna C. Faust

Inventor
John F. Dornfeld
By Benedict & Morsell
Attorneys

THE NORRIS PETERS CO., PHOTO-LITHO., WASHINGTON, D. C.

No. 636,959. Patented Nov. 14, 1899.
J. F. DORNFELD.
MALT TURNING AND STIRRING MECHANISM.
(Application filed Nov. 2, 1898.)
(No Model.) 6 Sheets—Sheet 2.

No. 636,959. Patented Nov. 14, 1899.
J. F. DORNFELD.
MALT TURNING AND STIRRING MECHANISM.
(Application filed Nov. 2, 1898.)
(No Model.) 6 Sheets—Sheet 3.

Witnesses. Inventor.
John F. Dornfeld
By Benedict Morsell
Attorneys.

No. 636,959. Patented Nov. 14, 1899.
J. F. DORNFELD.
MALT TURNING AND STIRRING MECHANISM.
(Application filed Nov. 2, 1898.)
(No Model.) 6 Sheets—Sheet 4.

Witnesses. Inventor.
John F. Dornfeld
By Benedict & Morsell
Attorneys.

THE NORRIS PETERS CO., PHOTO-LITHO., WASHINGTON, D. C.

No. 636,959. Patented Nov. 14, 1899.
J. F. DORNFELD.
MALT TURNING AND STIRRING MECHANISM.
(Application filed Nov. 2, 1898.)
(No Model.) 6 Sheets—Sheet 5.

Witnesses:
Inventor:
John F. Dornfeld
By Benedict & Morsell
Attorneys.

No. 636,959. Patented Nov. 14, 1899.
J. F. DORNFELD.
MALT TURNING AND STIRRING MECHANISM.
(Application filed Nov. 2, 1898.)
(No Model.) 6 Sheets—Sheet 6.

Witnesses.
Inventor.
John F. Dornfeld
By Benedict & Morsell
Attorneys.

UNITED STATES PATENT OFFICE.

JOHN F. DORNFELD, OF MILWAUKEE, WISCONSIN.

MALT TURNING AND STIRRING MECHANISM.

SPECIFICATION forming part of Letters Patent No. 636,959, dated November 14, 1899.

Application filed November 2, 1898. Serial No. 695,292. (No model.)

*To all whom it may concern:*

Be it known that I, JOHN F. DORNFELD, of Milwaukee, in the county of Milwaukee and State of Wisconsin, have invented a new and useful Improvement in Malt Turning and Stirring Mechanisms, of which the following is a description, reference being had to the accompanying drawings, which are a part of this specification.

This invention relates to improvements in malt turning and stirring mechanism of the general character of that shown and described in Letters Patent of the United States Nos. 532,543, 532,544, and 539,860, heretofore issued to me.

The invention relates to the improved construction of the mechanism with reference to strength and durability of parts, the best utilization of power, capability and facility of operation, and to securing the best and most satisfactory results both in the operation of the mechanism itself and in the material operated on.

The invention consists of the mechanism, its parts, and combinations of parts, as hereinafter described and claimed, or their equivalents.

Figure 1:
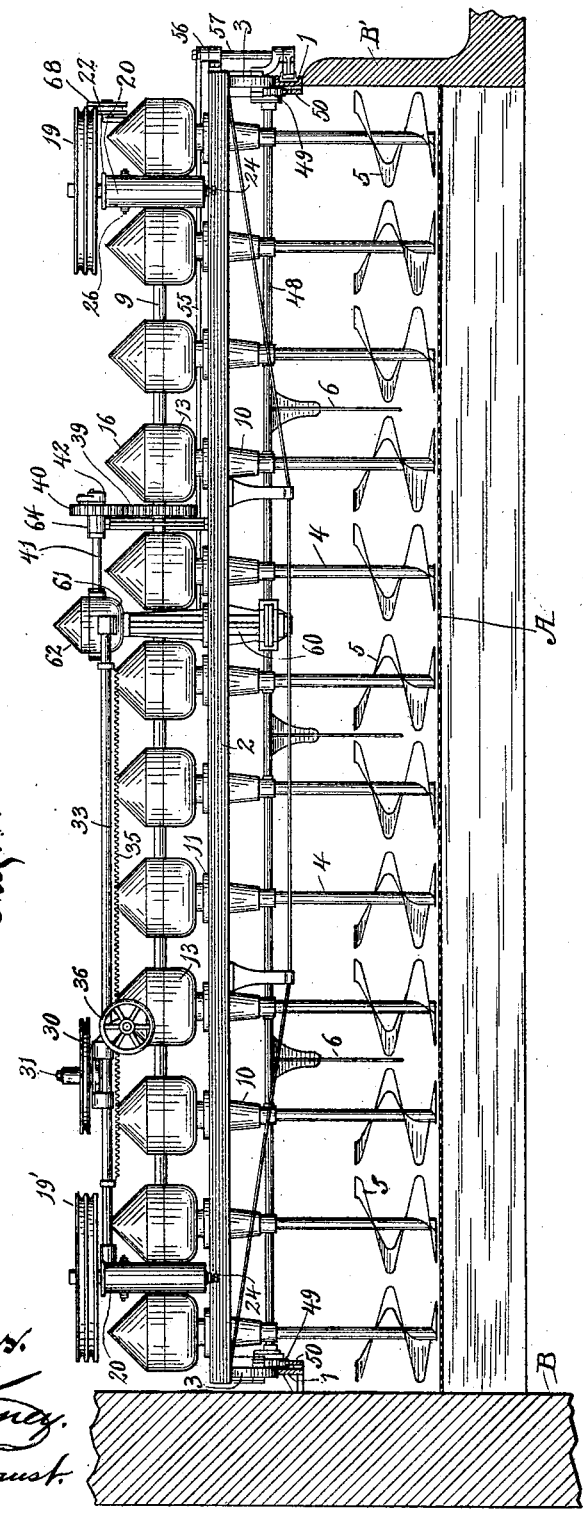
Figure 2:
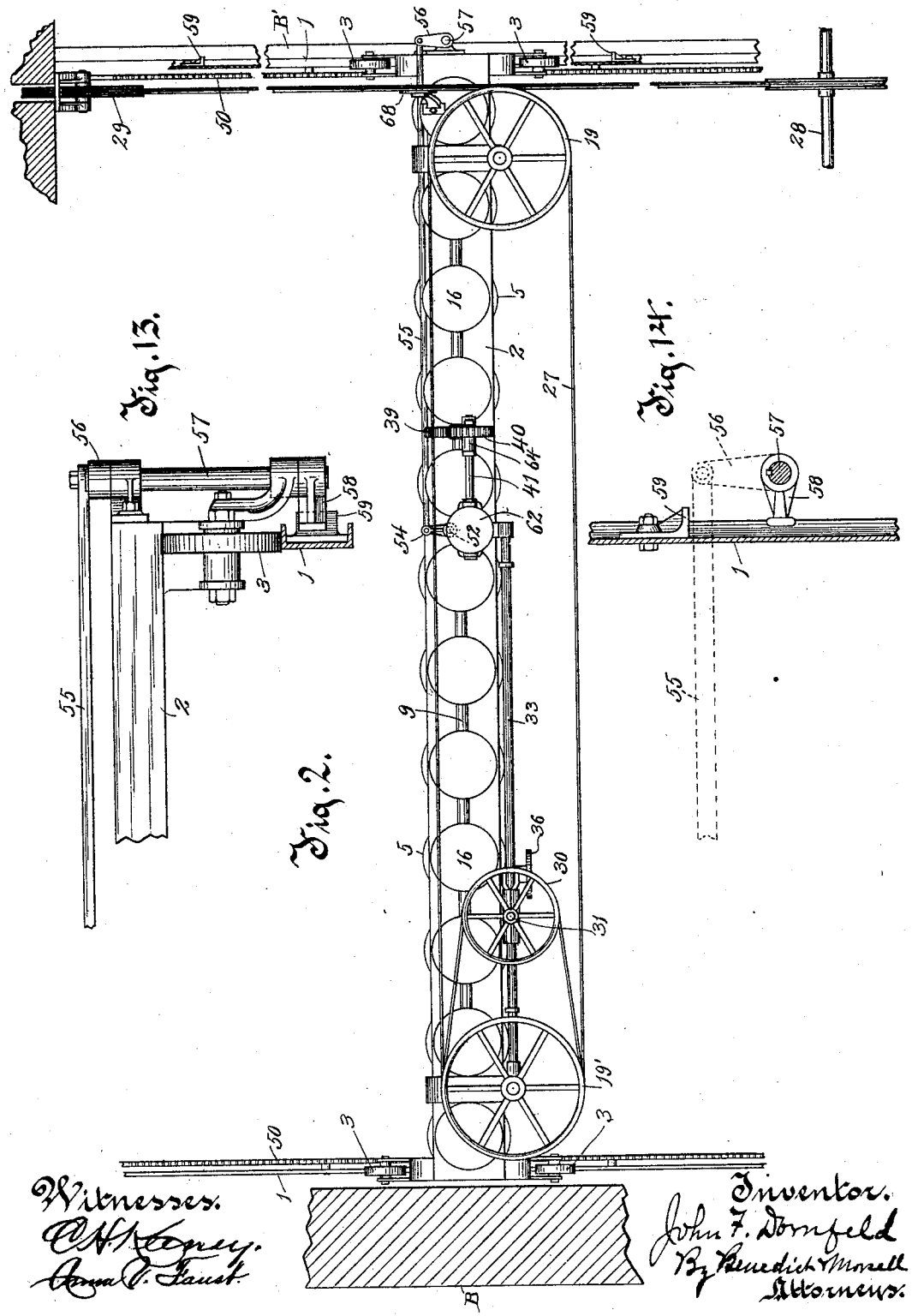
Figure 3:
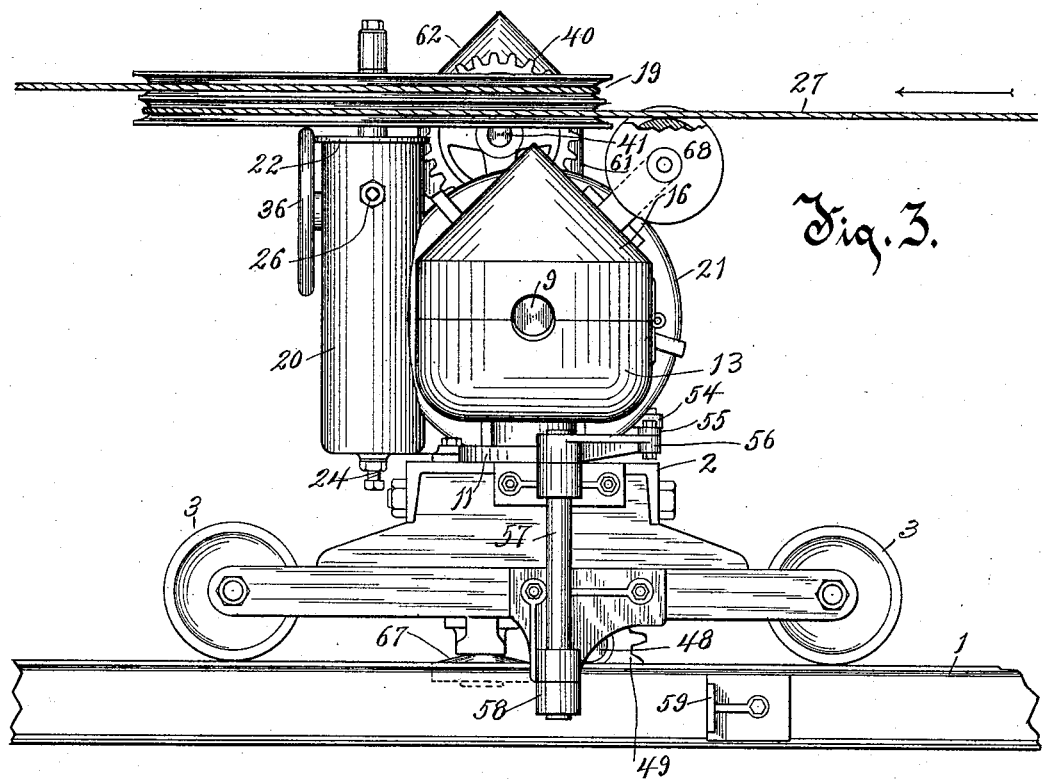
Figures 4, 5:
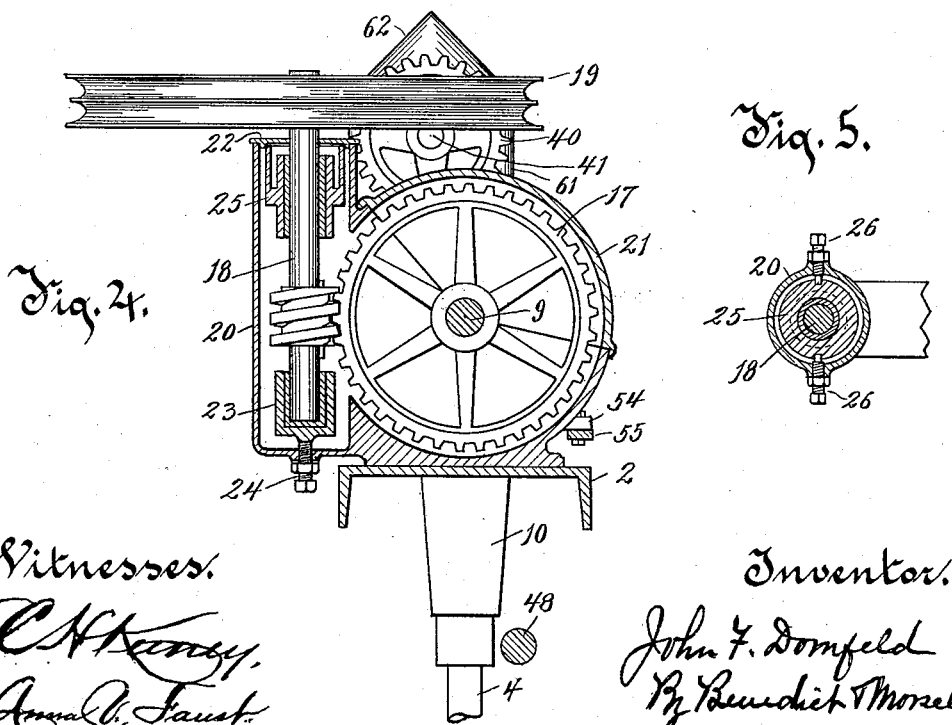
Figure 6:
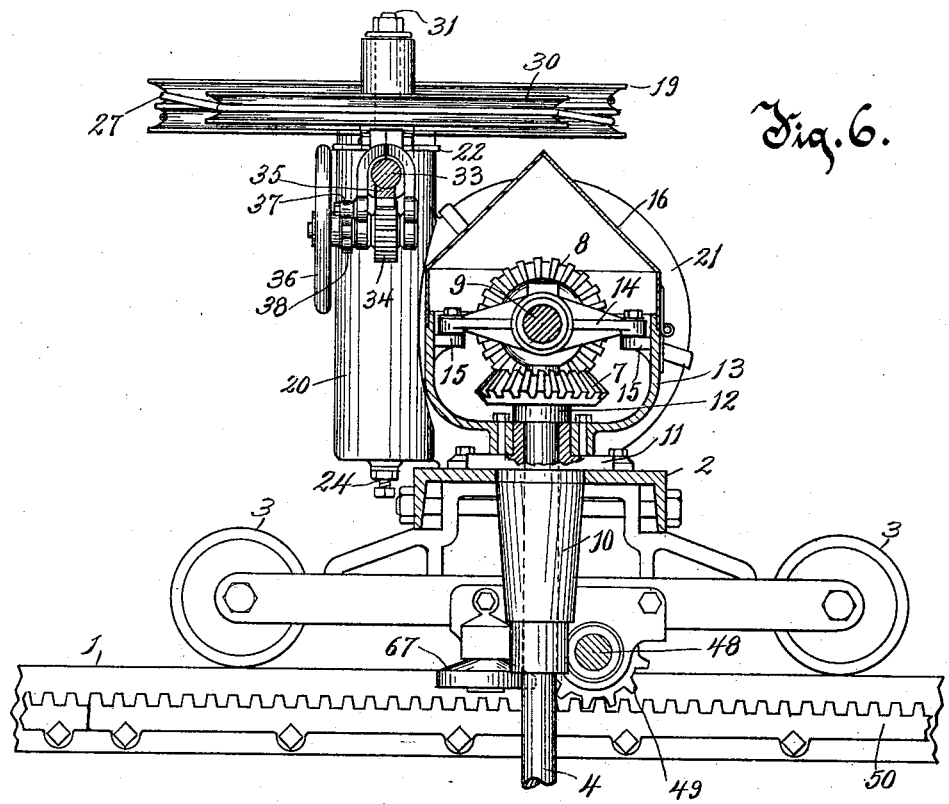
Figure 7:
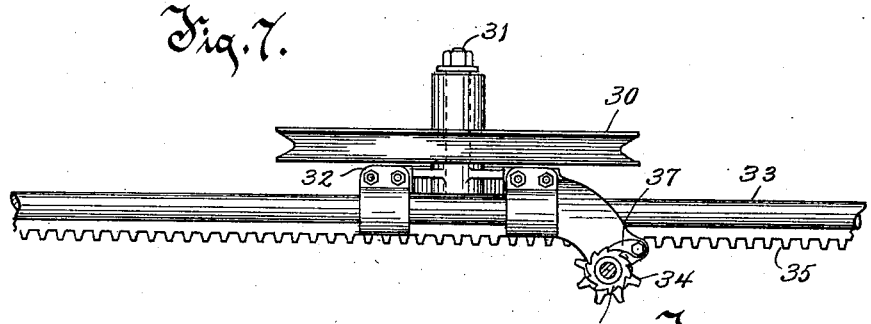
Figure 8:
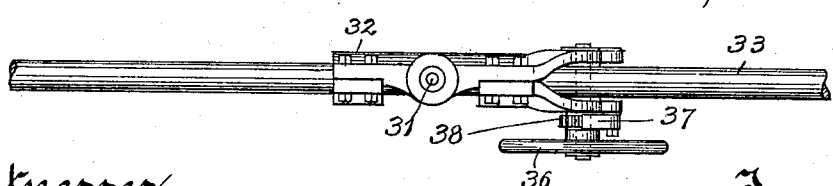
Figure 9:
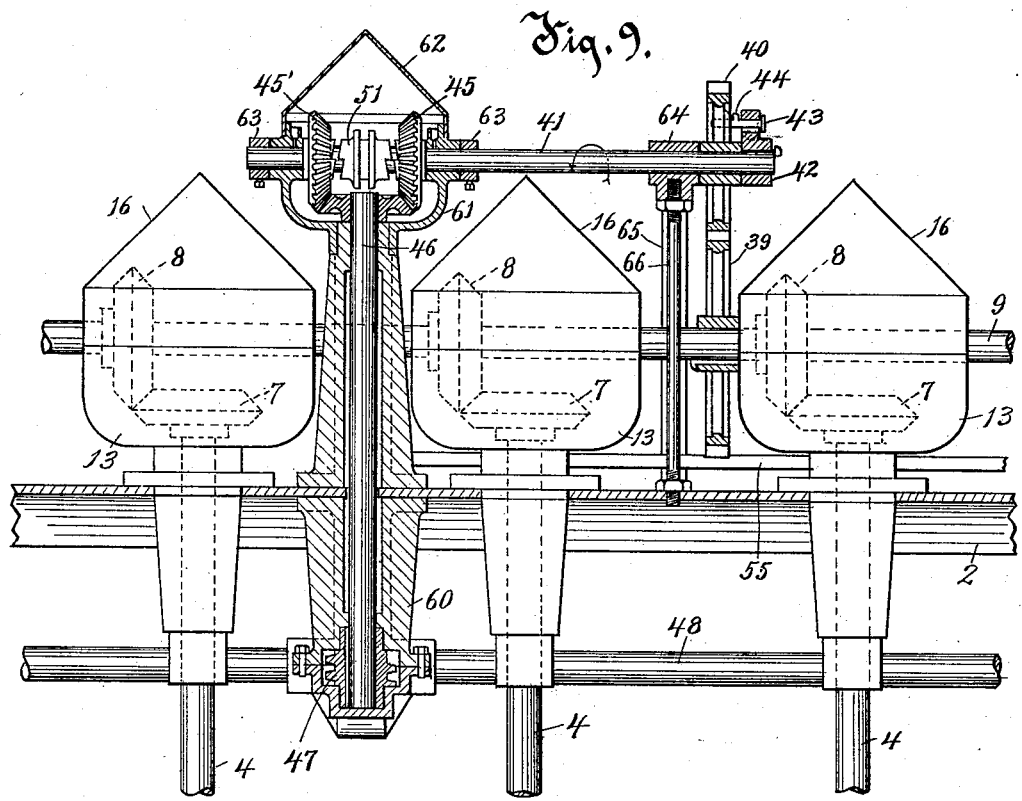
Figure 10:
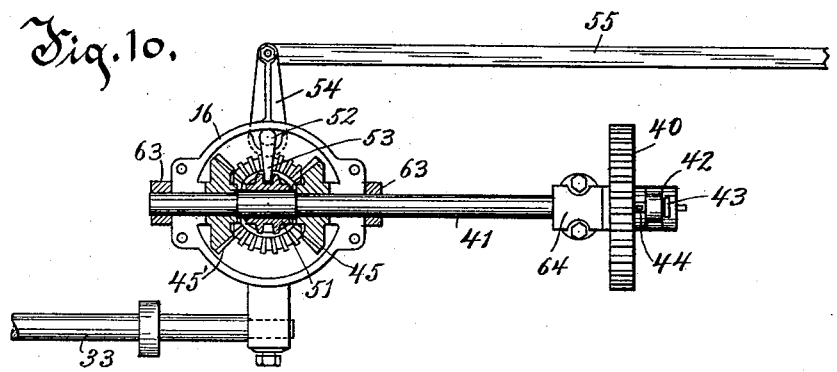
Figure 11:
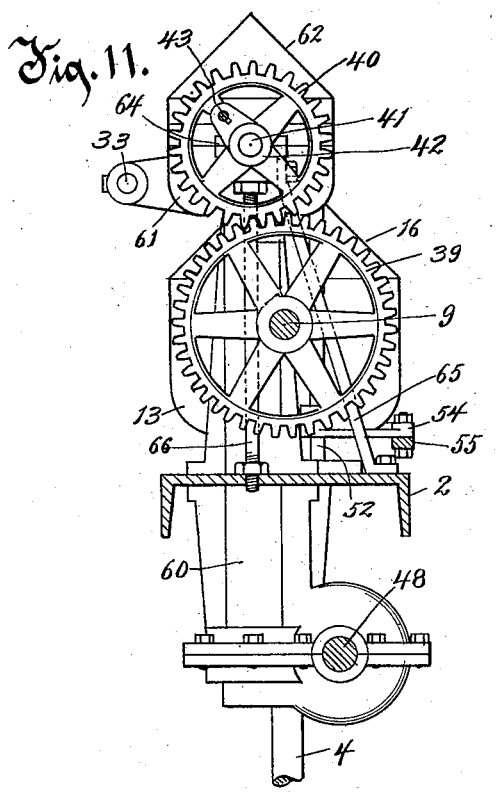
Figure 12:
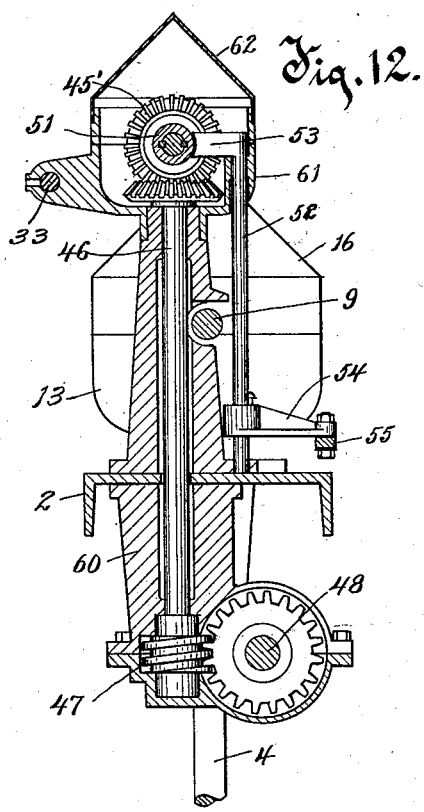
Figure 15:
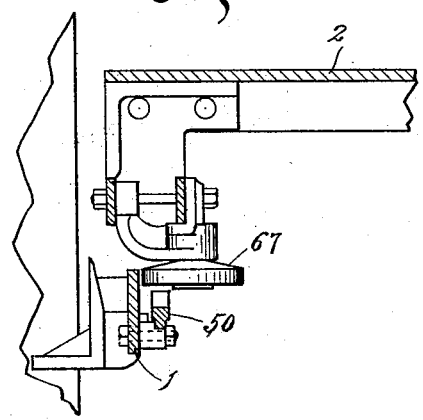
Figure 16:
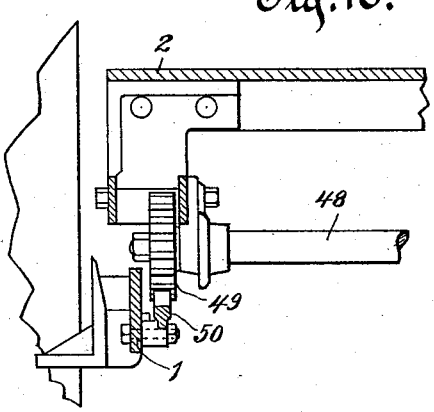

In the drawings, Figure 1 is an elevation of a carriage on which the malt turning and stirring devices are mounted and in which my present improvements are embodied, and in connection with a transverse section of a malting-compartment of a malt-house. Fig. 2 is a top plan view of the carriage and mechanism mounted thereon shown in Fig. 1, with additional mechanism illustrating the means for and method of moving the carriage. Fig. 3 is an elevation of the end of the carriage and related devices as seen from the right in Fig. 1. Fig. 4 is an elevation of mechanism in the interior of cases shown in Fig. 3, the cases in Fig. 4 being shown in section. Fig. 5 is a detail of the construction of parts shown in Figs. 3 and 4. Fig. 6 is a vertical transverse section of the carriage, showing related parts and mechanism in one of the cases in elevation. Figs. 7 and 8 are details of the construction shown at the left near the top in Fig. 6. Fig. 9 is a detail of mechanism for operating the shaft that rotates the malt stirrers or shovels and the shaft that drives the carriage reciprocably, in connection with fragments of the carriage shown partially in section and gearing-cases indicated in outline. Fig. 10 is a detail of clutch mechanism and related parts shown in position in Fig. 9. Fig. 11 is a transverse section of the mechanism shown in Fig. 9 near the right thereof and looking toward the left. Fig. 12 is a transverse section of the mechanism and related parts shown in Fig. 9 toward the left thereof. Figs. 13 and 14 are details of devices for shifting the clutch shown in Figs. 9 and 10, these devices and their relation to the general construction being shown on smaller scale in Figs. 1 and 2. Figs. 15 and 16 are details, respectively, of constructions for retaining the carriage on its track and for reciprocating it thereon.

In the drawings, A is the perforated floor of a malting-compartment in a malt-house, and B and B' are the side walls, respectively, of the malting-compartment. Horizontal rails 1 1 are secured, respectively, to the walls B and B' above the malting-floor, on which the carriage 2 and the mechanism mounted thereon are supported and travel forward and back above the malting-floor. The carriage 2 consists of a suitable frame extending over the malting-floor from one wall thereof to the other, on which the malt-stirring mechanism and carriage-driving mechanism are mounted. The carriage is provided with wheels 3 3, that support it and its load traveling on the rails 1 1.

A series of shafts 4 4, mounted in the carriage at little distances apart in a line across the compartment-floor, depend from the carriage nearly to the floor A, and these shafts are each provided with a spiral shovel or malt turner and lifter 5, adapted as the shafts are rotated and as the carriage travels over the floor to lift and stir the malt lying thereon. Some depending partitions or bulkheads 6, hinged on the frame and depending therefrom between adjacent shovels 5 5 at several localities, are adapted to prevent the movement of the malt bodily laterally on the floor as the stirrers are moved through it.

For rotating the shafts 4 and the spiral shovels 5, fixed thereon, the shafts are each provided with a beveled gear-wheel 7, which meshes with a beveled gear 8 on the stirrer-driving shaft 9. For supporting the shafts 4 rotatably in the carriage in vertical position each shaft is mounted in and depends from an elongated sleeve-boxing 10, Fig. 6, which is provided with a laterally-projecting annular flange 11, that rests on the frame of the carriage and is bolted thereto, the boxing extending considerably below and somewhat above the flange 11. The gear-wheels 7, fixed on the shafts 4, are each provided with a hub 12, the lower end of which forms a bearing resting revolubly on the top extremity of the boxing 10, whereby the shaft is supported revolubly. A cup-shaped pedestal 13, resting on the flange 11 and secured thereto, is fitted about the upper extremity of the boxing 10 and extends upwardly therefrom, partially inclosing the gear-wheel 7, and a truss or bridge-piece 14 is supported therein, resting on brackets 15 therefor rigid on the pedestal. The shaft 9 is journaled and supported revolubly in the several bridge-pieces 14 above the several shafts 4. To protect the wheels 7 and 8 from dust or other foreign substances, such even as malt dumped from the floor above, a cap 16, preferably of cone shape, is fitted on the top edge of the pedestal 13 and is preferably hinged thereto. The pedestal 13 and the cap 16 form a substantially tight case, inclosing the gear-wheels 7 and 8 and the bearings of the shafts 4 and 9.

The shaft 9 is provided with a plurality of worm-wheels 17, Fig. 4, meshing with worms on the upright shafts 18, provided with grooved driving-pulleys 19 19'. The wheels 17 and the shafts 18 are inclosed in suitably-formed case-brackets 20. A removable lid or cover 21 forms a portion of the case that incloses the wheel 17, and a removable cover 22 is on that portion of the case which immediately surrounds the shaft 18. The shaft 18 is footed and supported revolubly in a step-box 23, located in the case 20 and supported, adjustable vertically thereby, by means of the screw 24, turning in the case 20 against the step-box. The upper portion of the shaft 18 is journaled in a sleeve-box 25, that is held in position and so as to be capable of slight adjustment laterally by means of set-screws 26, Fig. 5, turning through the case 20 and into sockets therefor in the box 25.

For driving the shafts 18 and therefrom the shaft 9 and the stirrer-shafts 4 an endless belt 27, Figs. 1, 2, and 3, running on a driven power-supply shaft 28, located at or near one end of the malting-compartment, runs also about an idle pulley 29, at or near the other end of the malting-compartment above the malting-floor, and one line of this endless belt runs about the pulley 19 and thence about the pulley 19', both mounted on the carriage, and also about a tightening-pulley 30, mounted adjustably on the carriage. By the means described the spiral shovels 5 are rotated constantly in one direction. The pulley 30 is axled on an arbor 31, Figs. 1, 7, and 8, fixed on a frame 32, slidable on a bar 33, fixed on the carriage 2. The bar 33 is so disposed that the pulley 30 is capable of being moved from and toward the pulley 19', whereby the belt can be tightened or released, as described. The sliding frame 32 is provided with a toothed wheel 34, meshing with a rack 35 on the bar 33, and the axle of the toothed wheel 34 is provided with a hand-wheel 36, Figs. 1, 6, and 8, whereby the toothed wheel can be rotated and the frame 32 moved along the rod 33. A pawl 37, pivoted on the frame 32, takes into a ratchet-wheel 38 on the axle of the toothed wheel 34 and prevents its rotation in one direction.

The carriage 2 is intended and adapted to travel on the rails 1 1 back and forth over the compartment-floor, substantially from end to end thereof. For reciprocating the carriage a cog-wheel 39, fixed on the shaft 9, Figs. 1, 9, and 11, meshes with a cog-wheel 40, loose on a counter-shaft 41, mounted on the carriage-frame. A collar 42, keyed on the shaft 41, has a short radially-projecting arm provided with a removable pin 43, adapted to be inserted through an aperture therefor in the collar-arm and into an aperture therefor in a spoke of the wheel 40. By this means the wheel 40 is locked revolubly to the shaft 41. The pin 43 is provided with a stud-key 44, adapted to pass, with the pin 43, through the aperture therefor in the collar-arm 42, Figs. 9 and 11, and being turned revolubly slightly locks the pin releasably in position. Two beveled gear-wheels 45 45', loose on the shaft 41, mesh on opposite sides with a cog-wheel fixed on the shaft 46, and this shaft is provided with a worm 47, Figs. 9 and 12, that gears with a worm-wheel on the carriage-driving shaft 48. The shaft 48 is provided with toothed wheels 49, Figs. 1, 6, and 16, that mesh with the racks 50 alongside of and bolted to the rails 1 1. By the rotation of the shaft 48 alternately in reverse directions the carriage is caused to travel back and forth reciprocally on the rails 1 1 over the malting-floor. A clutch-collar 51, splined on the shaft 41 between the wheels 45 45', is adapted to engage, respectively, either with the wheel 45 or 45' and cause the wheel thus engaged to rotate with the shaft
41. The automatic shifting of the clutch 51 at the respective limits of the travel of the carriage over the malting-floor is accomplished by means of a rock-shaft 52, mounted on the carriage, which rock-shaft is provided with a radially-projecting finger 53, that enters an annular channel therefor on the clutch-collar 51, and also with a crank-arm 54, connected by a rod 55, Figs. 1, 2, 10, and 12, to the extremity of a crank-arm 56 on a rock-shaft 57, which rock-shaft 57 is also provided with a radially-projecting finger 58, adapted to contact with stops 59 59, Figs. 1, 2, 3, 13, and 14, secured adjustably to the side of a rail 1 in the line of the travel of the finger 58 and at the respective limits of the reciprocation of the carriage on the rails. As the finger 58 comes to a stop 59 it is engaged thereby, and by the motion of the carriage the rock-shaft 57 is shifted, shifting the clutch 51 from engagement with the wheel 45 or 45', whereby the travel of the carriage is stopped. The attendant can start the carriage traveling in the reverse direction by a further shifting of the clutch into engagement with the other wheel 45 or 45'.

The vertically-disposed shaft 46 is footed and mounted in an elongated case-boxing 60, fixed on the carriage-frame, and a cup-like bracket 61, secured to the upper extremity of the boxing 60, forms a continuation thereof, in the sides of which boxes are formed, in which the shaft 41 is mounted at or near one extremity thereof. The gear-wheels 45 45' and the clutch 51 are located within this cup-like bracket 61, and a cone-shaped removable cap 62, fitted on and over the top of the bracket 61, forms therewith an inclosed case or chamber for the mechanism therein. The shaft 41 is secured against movement endwise by means of the collars 63 63, secured adjustably thereon and abutting, respectively, movably against the outer ends of the boxes in the bracket 61. The other extremity of the shaft 41 has its bearing in a journal-block 64, supported on the frame by the obliquely-disposed wrought iron or steel leg 65, and by reason of the slight elasticity of this leg is adapted to be adjusted or alined by means of the rod 66, Figs. 9 and 11, provided with reversely-screw-threaded ends that turn in nuts bearing, respectively, against the carriage-frame below and against the journal-block above.

To prevent improper movement laterally of the carriage on the rails and to obviate the considerable friction that would occur if the carriage-wheels were flanged to keep them on the rails, I prefer to employ wheels 3 3, having laterally-flat perimeters, and to prevent these wheels from leaving the rails I employ horizontally-disposed guide-wheels 67 67, Figs. 3, 6, and 15, mounted on the carriage, one at each end thereof opposite the inner surfaces of the rails 1 1. These guide-wheels 67 are located very close to the surfaces of the rails, but so as not to touch them if the carriage travels truly thereon, and yet so near to the rails that any substantial movement of the carriage laterally will bring the wheel against the rail and prevent further lateral movement in that direction, while by reason of the free travel of the guide-wheel on the rail any considerable friction is obviated.

An idle pulley 68, mounted on the carriage, conveniently by a bracket 69, fixed on a cap 16, is adapted to support the belt 27 in front of and guide it to the pulley 19.

As will be clearly understood by referring to the drawings in connection with the foregoing description, the mechanism in operation is driven by power supplied through shaft 28, Fig. 2, which is thence transmitted by the endless belt 27 (running on that shaft and on pulleys 19 and 19') through shaft 18, Figs. 1, 3, and 4, to the shaft 9. Shaft 9 is geared to shaft 41, Figs. 1, 9, and 11, and this shaft 41 transmits power through shaft 46 to shaft 48, Figs. 1, 9, and 12, which is provided with cog-wheels 49, gearing with horizontal racks 50, Figs. 1 and 6, whereby the carriage is reciprocated over the malting-floor. The shaft 9 is geared directly to the shovel-shafts 4, Figs. 1 and 6, and rotates these shafts constantly in one direction, while the carriage is being reciprocated over the malting-floor. The operation of the several parts of the mechanism is fully described hereinbefore.

What I claim as my invention is—

1. In malt-stirring mechanism, a carriage reciprocable over the malting-floor, an endless driving-belt disposed in a substantially horizontal plane running in the direction of the travel of the carriage, a driving-pulley on the carriage on which the driving-belt runs, a belt-carrying tightening-pulley in the horizontal plane of said belt movable toward and from the driving-pulley, a bar provided with a rack fixed on the carriage extending in a substantially radial direction from said driving-pulley, a frame on which said tightening-pulley is mounted movable on said bar, a toothed wheel journaled in said frame gearing with said rack, means for rotating said toothed wheel, and means for releasably locking it against rotation rearwardly.

2. In malt-stirring mechanism, the combination with a horizontally-reciprocating carriage and a series of shovel-provided shafts depending from the carriage arranged in a right line, of a horizontally-disposed driving-shaft geared to each of said shovel-shafts, a vertical shaft or shafts geared directly to said driving-shaft, a horizontally-disposed pulley on each of said vertical shafts adapted to take an endless driving-belt thereon, a horizontally-disposed counter-shaft geared directly to said driving-shaft, a vertical shaft geared directly to the counter-shaft, and a horizontally-disposed carriage-driving shaft geared directly to said last-enumerated vertical shaft.

3. In malt-stirring mechanism, the combination of a cup-shaped pedestal fixed on a carriage-frame, a bridge within the cup of the pedestal and supported thereon transversely thereof, and a driving-shaft journaled in said bridge.

4. In malt-stirring mechanism, the combination of a cup-shaped pedestal fixed on a carriage, of cog-wheels meshing with each other within the cup, and a cone-shaped cover fitted on the pedestal forming therewith a tight case inclosing said toothed wheels.

5. In malt-stirring mechanism, the combination with a carriage-frame, of elongated shaft-boxing provided medially with a radially-projecting flange resting on the carriage-frame, a cup-shaped pedestal fitted about the boxing above the flange and secured to the boxing, a shovel-provided shaft having a gear-wheel fixed on its upper extremity, the hub of which gear-wheel rests movably on the end of said boxing within said pedestal.

6. In malt-stirring mechanism, the combination with a carriage-frame, of a cup-shaped bracket 61 having journal-boxes formed in and made a part of its opposite walls, a shaft passing transversely through said bracket and having its bearing in said boxes, and a gear wheel or wheels on said shaft within the cup-shaped bracket.

7. In malt-stirring mechanism, the combination with a carriage-frame, of a vertically-disposed shaft 46, an elongated case-boxing fixed on the frame in which said shaft is mounted, a cog-wheel on the upper extremity of said shaft, a cup-shaped bracket fixed on the case-boxing, a shaft passing transversely through the cup-shaped bracket, cog-wheels on the transverse shaft meshing with the wheel on the vertical shaft, and a cover on the cup-shaped bracket over said wheels.

8. The combination with a shaft 41 and a relatively-fixed bearing near one extremity thereof, of a journal-block 64 for supporting the other end of the shaft, an obliquely-disposed slightly-yielding supporting-leg, and a vertically-disposed adjusting-rod provided with reverse screw-threads at its extremities turning in nuts bearing respectively against said journal-block and a relatively-fixed support.

9. In malt-stirring mechanism, the combination of a driving-shaft 9 provided with a cog-wheel 39, a counter-shaft 41 provided with a fixed collar-arm 42, a cog-wheel loose on the counter-shaft meshing with the cog-wheel on the driving-shaft, a detachable pin adapted to lock said loose wheel to the collar-arm, two oppositely-disposed beveled gear-wheels loose on the counter-shaft, a clutch splined on the counter-shaft adapted to lock severally each of the beveled wheels to the counter-shaft, and a vertical shaft capable of rotating reversely provided with a gear-wheel capable of taking into engagement one or the other of the loose beveled wheels on the counter-shaft.

10. The combination with a case-like bracket, of an adjustable step-box therein, a shaft 18 footed in the step-box, and a laterally-adjustable journal-box supported in the bracket in which box the other extremity of the shaft is journaled.

11. The combination with a case-like bracket, of a vertically-disposed shaft 18, an adjustable step-box in the bracket in which the shaft is footed, a box in the bracket near the upper extremity of the shaft in which the shaft is journaled, and means supporting the box adjustably and pivotally.

12. In malt-stirring mechanism, means for reciprocating the shovel-carrying carriage, comprising horizontal stationary racks adjacent to the ends of the carriage, a horizontal driven shaft 48 provided at its ends with gears meshing with said racks and medially with a worm-wheel, a second shaft 46 at a right angle to the driven shaft provided with a worm meshing with the worm-wheel on the driven shaft, a beveled wheel on said second shaft, a horizontally-disposed third shaft 41 geared directly to the driving-shaft 9 and provided with two beveled wheels revolubly loose on the shaft and constantly in mesh with the beveled wheel on said second shaft on opposite sides of its axis, the driving-shaft 9, and a clutch splined on said third shaft between the two beveled wheels thereon adapted to lock said beveled wheels one at a time to rotation with the shaft.

13. In malt-stirring mechanism, the combination with a horizontally-reciprocable carriage and a series of shovel-provided shafts depending from the carriage arranged in a right line, of a horizontally-disposed driving-shaft geared directly to each of said shovel-shafts and provided with a plurality of medially-disposed worm-wheels, vertical shafts provided with worms meshing with said worm-wheels, and a horizontally-disposed pulley on each of said vertical shafts adapted to take an endless driving-belt thereon whereby power can be applied from a single driving-belt to the shovel-driving shaft at a plurality of medial localities.

14. In malt-stirring mechanism, the combination with a horizontally-reciprocable carriage and a plurality of shovel-provided shafts arranged in a right line in the carriage, of a horizontally-disposed driving-shaft geared directly to each of said shovel-shafts and provided with a worm-wheel, a vertical shaft provided with a worm meshing with said worm-wheel, a horizontally-disposed pulley on said vertical shaft adapted to take an endless driving-belt thereon, and an idle pulley mounted on the carriage in front of and adapted to support and guide the belt to said horizontal driving-pulley.

In testimony whereof I affix my signature in presence of two witnesses.

JOHN F. DORNFELD.

Witnesses:
C. T. BENEDICT,
C. H. KEENEY.